(12) United States Patent
Dujardin et al.

(10) Patent No.: US 8,068,419 B2
(45) Date of Patent: Nov. 29, 2011

(54) SYSTEM AND METHOD FOR TRANSMITTING VIDEO, AUDIO, AND DATA CONTENT USING A FIBER OPTIC NETWORK

(76) Inventors: Jeremy Dujardin, Merrick, NY (US); Elio Parente, Merrick, NY (US); Abel Leite, Montpelier (FR)

( * ) Notice: Subject to any disclaimer, the term of this patent is extended or adjusted under 35 U.S.C. 154(b) by 0 days.

(21) Appl. No.: 12/270,529

(22) Filed: Nov. 13, 2008

(65) Prior Publication Data

US 2010/0271951 A1 Oct. 28, 2010

(51) Int. Cl.
*H04L 1/00* (2006.01)
(52) U.S. Cl. ........ 370/230; 370/235; 370/252; 370/468; 725/91

(58) Field of Classification Search .......... 370/229–235, 370/252, 253, 468; 725/86, 87, 91, 104
See application file for complete search history.

(56) References Cited

U.S. PATENT DOCUMENTS

| | | | |
|---|---|---|---|
| 2004/0184483 A1* | 9/2004 | Okamura et al. | 370/477 |
| 2008/0015932 A1* | 1/2008 | Haeuser et al. | 725/32 |
| 2008/0232379 A1* | 9/2008 | Mohamed et al. | 370/395.53 |

* cited by examiner

*Primary Examiner* — Pao Sinkantarakorn
(74) *Attorney, Agent, or Firm* — Todd L. Juneau

(57) ABSTRACT

The present invention is directed to a system and method for controlling a data transmission network, and in particular, to a fiber optic broadcast quality video and audio transmission network, that can also provide customers, or users, the feature of accessing and controlling network parameters to set up and customize their own network connection and services, and where the fiber optic network may also be integrated with satellite transmission.

9 Claims, 9 Drawing Sheets

| Start | Order # | Customer | To Location | Transmission Status | Service | End Date/Time |
|---|---|---|---|---|---|---|
| 06:15 | TZ449267 | ESPN | Chicago | Active | Compressed 40 Mbps | 08/17/2002 15:00 |
| 07:30 | HG36619 | ABC Broadcasting | Los Angeles | Active | Compressed 60 Mbps | 08/17/2002 20:00 |
| 08:00 | JE477201 | FOX | Los Angeles | Error | Compressed 10 Mbps | 08/17/2002 11:00 |
| 08:30 | PL637308 | MSNBC | Los Angeles | Pending | Compressed 20 Mbps | 08/18/2002 16:00 |
| 08:30 | DR52861 | Channel 4 | Chicago | Pending | Compressed 45 Mbps | 08/17/2002 17:30 |

FIG. 3D

GENESIS
NETWORKS
*A new beginning in global video transmission*

Home | Admin | Orders | Network | Financial | Trouble Tickets

Network Error Segment

Customer: Fox    Order: JE477201    Type of Service: Compressed 10 Mbps

From: New York

| Devices | IP Address | Sentry Port | Serial # | Model | Rack | URL | Telnet Session |
|---|---|---|---|---|---|---|---|
| Globecast | | | | | | | |
| Leitch01 | 110.103.61.102 | D1 | | | | | |
| AutoPatch 01 | 146.70.10.91 | D3 | | | | | |
| Sony 01: MSB2000 | 56.112.208.172 | D2 | | | | | |
| Path1 03 CX1000 | 117.16.53.119 | D6 | | | | | |
| Riverstone 04 | 153.105.115.32 | D4 | | | | | |

To: Los Angeles

| Devices | IP Address | Sentry Port | Serial # | Model | Rack | URL | Telnet Session |
|---|---|---|---|---|---|---|---|
| Globecast | | | | | | | |
| Leitch01 | 110.103.61.102 | D1 | | | | | |
| AutoPatch 01 | 146.70.10.91 | D3 | | | | | |
| Sony 02 MSB2000 | 56.112.208.172 | D2 | | | | | |
| Path1 03 CX1000 | 117.16.53.119 | D6 | | | | | |
| Riverstone 04 | 153.105.115.82 | D4 | | | | | |

Return

SYSTEM AND METHOD FOR TRANSMITTING VIDEO, AUDIO, AND DATA CONTENT USING A FIBER OPTIC NETWORK

FIELD OF THE INVENTION

The present invention is directed to a system and method for controlling a data transmission network, and in particular, to a fiber optic broadcast quality video and audio transmission network, that can also provide customers, or users, the feature of accessing and controlling network parameters to set up and customize their own network connection and services, and where the fiber optic network may also be integrated with satellite transmission.

DESCRIPTION OF RELATED ART

To transmit video and audio broadcasts, previous systems and methods often required multiple satellite uplinks along with patches from one circuit to another. A transmission from Beijing to El Paso might have required a satellite feed up and down to Singapore, and again to Los Angeles, where the transmission would be patched into a terrestrial network, first to Chicago, then to Dallas, and then finally by microwave from Dallas to El Paso.

Further setting up such a circuit might require hours or days while technicians set these up by hand. Further, these services were complex, and were not controllable or customizable by end users, the customer. Additionally, monitoring for error, making changes of any sort, scheduling ahead of time, all of these were either not practical or not practically possible. Also customers had no effective control over their own usage or pricing for these services.

This inability to provision, control, analyze and monitor remotely the equipment used to transport data within a data transmission network prevented development of the industry.

Previous systems also used circuit-switched facilities as well as private dedicated and conditioned telecommunications circuits to transport audio and video data between distant locations in real time or near real time. The implementations using these transmission facilities were significantly more costly than transmission networks using packet-based facilities as is implemented in an embodiment of the present invention. Previous implementations required the purchase, maintenance, and ongoing conditioning of full-time dedicated interconnecting facilities provided by telecommunications service providers. Prior to this invention, for example, it was not possible to reconfigure quickly and automatically the data transmission network for a variety of simultaneous and successive data transfers between locations as is possible with the software control system and data transmission network of the present invention.

U.S. Pat. No. 7,321,572 to Fielding discloses a frame relay protocol-based earth station interface architecture provides full mesh connectivity for a relatively small number of network stations. The fundamental component of the architecture is a frame relay protocol-based switch, which employs a network interface 'frame relay' standard to define the multiplexing of multiple virtual ports across single physical communications port. Through address and control fields of its connectivity control software, the frame relay protocol-based switch can be dynamically configured to provide multilayer addressing and device selectivity, thereby enabling point-to-point connectivity of multiple terminal devices, such as a plurality of audio circuits, to be effected via a single port. Dial codes on the station side of an audio signal multiplexer link are translated into frame relay addresses (data link connection identifiers) that are added to each frame of data for routing through the network. With this additional layer of routing information, audio (voice) connectivity is now available between any two audio circuits (e.g. trunks) in the network.

U.S. Pat. No. 6,931,011 to Giacopelli discloses a method and system for bandwidth management in a packet-based network utilizes processing based on bandwidth management policies defined by subscribers and service providers. This method and system allow a subscriber to control the bandwidth available for sessions in near-real time and simplify provisioning at hubs and gateways by allowing the voice/data bandwidth ratio to be established independently of the provisioned bandwidth for voice and data. Bandwidth management policies are stored in the database of the service manager. When a request for modification of the maximum bandwidth parameter for an access hub is received, a mid-call event is detected or a new session is attempted by a subscriber, the service manager determines the current bandwidth utilization and whether this current bandwidth utilization exceeds the maximum bandwidth defined. If the new maximum bandwidth is exceeded, the service manager performs policy processing. Policy processing involves the retrieval of bandwidth management policies from the service manager database and the determination of the method of bandwidth reduction supported by the access hub. If forced reduction of bandwidth is supported, the bandwidth management entity identifies a current session at the access hub for bandwidth reduction and attempts connectivity modification. If successful, the call processing entity determines a new bandwidth utilization based on the reduced bandwidth and whether the new bandwidth exceeds the maximum bandwidth defined by the subscriber. If the maximum bandwidth is still exceeded, the service manager will repeats policy processing to identify another session for bandwidth reduction.

U.S. Pat. No. 5,539,884 to Robrock discloses a broadband intelligent network (50) an ATM switch or other fast-packet switch (51) in a fiber optic, fast-packet communication system. The ATM switch (51) is directly coupled (53) through one of its ports to a network service control point (61) for the implementation of requested services without the use of an intermediate common channel signaling system. ATM cells, identified as signaling cells, carry customer service requests and are automatically routed through the ATM switch to the network service control point (61). The service control point (61) determines the requested service and executes a corresponding programmed procedure (210). Connection service requested by a particular signaling cell is implemented by the service control point (61) sending a command cell through a port of the ATM switch (51) to instruct the switch connection management processor (64) to establish a switched virtual circuit for the requested connection.

U.S. Pat. No. 5,239,537 to Takauchi discloses in a broadband ISDN system where each switching node is connected to each adjacent node by a transmission line having communication links and a service link, the switching node comprises a self-routing network for routing a cell from an input to an output of the network according to a virtual path identifier it contains. Static connections are established between communication links and the routing network by a digital cross-connect system. A virtual path memory stores data indicating link-to-link connections associated with normal virtual paths and link-to-link connections associated with alternate virtual paths. A fault detector is coupled to the communication links to detect a link failure. If a link failure occurs, a fault message is transmitted to adjacent switching nodes through service links, and data corresponding to the faulty link is retrieved from the memory in response to a fault message that is received from the fault detector or from an adjacent node. The cross-connect system is controlled in accordance with the retrieved data so that the route of the cells is switched from a normal virtual path to an alternate virtual path.

U.S. Pat. No. 5,115,426 to Spanke discloses a broadband packet switch arrangement comprising a broadband packet unit connected to a plurality of customer lines and a video switch for selectively connecting packetized video signals from a plurality of video sources to the customer lines. The broadband packet switch unit selectively connects customer lines and transmits received control packets received from the customer lines to a control unit which responds to video request packets by controlling the video switch to connect selected video packets to the customers lines. Each customer line includes a selector circuit which receives video packets and inter-customer broadband ISDN packets and merges them onto the customer line. After the control unit has granted permission to connect a video source to a customer line, video source change requests for the line are sent directly to the video switch which responds thereto by connecting a requested video source to the customer line.

U.S. Published Application No. 20010013123 to Freeman discloses a Customized Programming creation system provides the ability to transmit Customized Programming offerings to individual users based upon their known profile or their responses to contemporaneous queries. In its basic form, the invention provides for a programming transmission center to maintain a single or multiple MPEG storage server environments. Through the use of digital conversion and MPEG compression standards, a vast library of programming and other information signals can be stored on such file servers. The transmission center selects and accesses programming segments or other information from the storage servers. Through the use of splice points encoded through the MPEG process, the programming transmission center can inconspicuously splice disparate program segments together to create a single custom program stream for delivery to a single user or multiple users of the same profile. Using interactive programming technology, a user profile is created and stored based on known, purchased and/or usage-based variables. The interactive programming system collects information through the user's receiver by monitoring the user's viewing habits and cataloguing user responses to interactive programming queries. Such profile information is transmitted to the programming transmission center via a backchannel communication link with the user's receiver. The Customized Programming stream may then be created to reinforce known or educated assumptions of programming and commercial selections that are most pertinent to the particular user, bringing some personalization to the vast library of stored programs and information.

U.S. Published Application No. 20050144645 to Casey discloses apparatus, methods and systems for providing relatively high-speed bandwidth to enable, inter alia, video transmission services over media previously unable to support such services. In accordance with certain embodiments, a device located at the telecommunication service provider can logically couple two or more physical media to provide a single, consolidated source of bandwidth, which can be used to transmit data, which can represent a video signal. In accordance with other embodiments, a device located at the subscriber's location can be used to receive the data from each of the two physical media and recreate the video signal from the data, such that the video signal can be transmitted to a display device, such as a television, monitor, etc.

SUMMARY OF THE INVENTION

Disclosed herein are preferred embodiments of methods and systems for transmitting and controlling video, audio, and/or data content over a fiber optic broadcast quality video and audio transmission network, that can also provide customers, or users, the feature of secure accessing and controlling network parameters to set up and customize their own network connection and services, and where the fiber optic network may also be integrated with satellite transmission.

In one preferred embodiment, there is provided a method for transmitting video and audio content over fiberoptic network, comprising the steps of: Provisioning the fiberoptic network from a network operations center which configures the network between an originating point-of-presence (POP) location and a terminating point-of-presence (POP) location for transmission of the video and/or audio content using a packet-based transmission medium; and Transmitting the video and/or audio content over the fiberoptic network from a content provider having a connection to the originating point-of-presence location to a content receiver having a connection to the terminating point-of-presence location.

In another preferred embodiment, the method includes that transmitting the content further comprises providing a user with control of one or more parameters of the network system, said parameters selected from the group consisting of bit rate data, provisioning data for provisioning network equipment and resources for transmission, booking data, type of delay, choice of PAL or NTSC TV format, number of minutes, repeatable templates, conflicting orders data, resource availability data, and monitoring data for querying and analyzing hardware devices, wherein the user is provided control of the one or more transmission parameters by having secure access to a network resource environment, said network resource environment comprising an interactive graphical user interface for viewing transmission network data stored in a database, wherein said interactive graphical user interface comprises an access feature for accessing said data and a control feature for viewing one or more parameters of the network system selected by said user.

In another preferred embodiment, the fiber optic network may also be integrated with satellite transmission.

In additional preferred embodiments, the method further comprises varying steps or features, including:

further comprising the step of converting content data from one format at the originating POP location to a different format prior to delivery at the terminating POP location;

further comprising the step of compressing content data at a POP location prior to delivery at a terminating POP location;

further comprising wherein the video and/or audio content is transmitted at a range of bandwidths from low definition to high definition (HD);

further comprising wherein the packet-based transmission medium is an MPLS VPN;

further comprising wherein the network system includes a user parameter for setting alarms to monitor device errors within the network system; and/or, further comprising wherein the transmission is a segmented point-to-multipoint transmission.

In another preferred embodiment, there is provided a system, comprising an end-to-end fiberoptic video and audio transmission network controlled by a network operations center, said network comprising an originating point-of-presence (POP) location and a terminating point-of-presence (POP) location, each of said POP locations having video and/or audio transmission equipment for transmitting video and/or audio content using a Multi-Protocol Label Switching Virtual Private Network (MPLS-VPN) packet-based transmission medium, a data processing system, signal monitoring equipment, and a multilayer switch, said network operations center comprising a software control system having a computer adapted for executing a plurality of computer software programs for communicating with the video and/or audio transmission network and for communicating with one or more computer databases, wherein said MPLS-VPN is configured to provide real time or near real time video and/or audio transmission services.

In a preferred embodiment, the end-to-end fiber optic network may also be integrated with satellite transmission.

In another preferred embodiment, a method of providing video transmission services over an fiberoptic network for transmission of video content is disclosed, comprising: Providing a user with access to an originating POP location and receiving video content from the user at the originating POP location, said originating POP location connected to the fiber optic network described above; and Transmitting video content over said fiber optic network to a terminating POP location.

In a preferred method, the fiber optic network may also be integrated with satellite transmission.

In another preferred embodiment, there is provided a method for providing user control of the end-to-end fiberoptic video and audio transmission network system herein, comprising the steps of: Providing a subscriber with secure access to a network resource environment, said network resource environment comprising an interactive graphical user interface for viewing transmission network data stored in a database, wherein said interactive graphical user interface comprises an access feature for accessing said data and a control feature for viewing one or more parameters of the network system selected by said subscriber, said parameters comprising reservation data for reserving a predetermined date and time to enable transmission of data, provisioning data for provisioning network equipment resources for data transmission, availability data to determine network availability, monitoring data for querying and analyzing hardware devices and signal quality, account data for retrieving price and billing information, and user-defined data; and, Performing one or more actions in response to the subscriber-selected parameters.

In this embodiment, additional features include: wherein the fiber optic network may also be integrated with satellite transmission; wherein the method is a web-based application; and/or wherein said parameters are saved to a user profile and are re-accessible during a later access session; and/or wherein said user-defined data is a customized set of parameters selected by the user.

In another preferred embodiment, there is provided a system for providing user control of the end-to-end fiberoptic video and audio transmission network system herein, the system comprising a server having a computer readable medium that contains program instructions executable by the server to: Provide a user with secure access to a network resource environment, said network resource environment comprising an interactive graphical user interface for viewing transmission network data stored in a database, wherein said interactive graphical user interface comprises an access feature for accessing said data and a control feature for viewing one or more parameters of the network system selected by said user, said parameters comprising reservation data for reserving a predetermined date and time to enable transmission of data, provisioning data for provisioning network equipment resources for data transmission, availability data to determine network availability, monitoring data for querying and analyzing hardware devices and signal quality, account data for retrieving price and billing information, and user-defined data; and, Perform one or more actions in response to the user-selected parameters.

In this system, additional features include: wherein the fiber optic network may also be integrated with satellite transmission; wherein the method is a web-based application; and/or wherein said parameters are saved to a user profile and are re-accessible during a later access session; and/or wherein said user-defined data is a customized set of parameters selected by the user.

In yet another preferred embodiment, there is provided a method of controlling a transport of data across a fiber optic transmission network, said transmission network comprising a local POP location and a remote POP location, said POP locations each comprising equipment in operable association, said equipment comprising at least one digital router, a customer premises circuit on said router, at least one transcoder, a standards converter, a video gateway device, and an IP switch said method comprising the steps of: (1) using a graphical user interface to input a service order comprising an identity of a data stream, a service time, at least one service circuit parameter, and a destination; (2) maintaining a database comprising (i) information relating to the service order, said service order information including the identity of the desired data stream and data relating to the availability of bandwidth needed to transport the desired data stream to the specified destination at the specified service time, and (ii) information relating to the operation of at least two of the routers in the transmission network, said operational information including data relating to configuration and operational status of a router, and data relating to future availability of a router to transport the desired data stream; using computer readable program code to automatically access the database to identify at least two routers that are available to transport the desired data stream across the transmission network the specified destination at the specified service time and using the specified service circuit parameter; (3) using computer readable program code to automatically schedule the service order using the identified at least two routers to transport the desired data stream across the transmission network to the destination at the specified service time and using the specified service circuit parameter; and (4) using computer readable program code to automatically activate each of the identified at least two routers at the desired service time to transport the desired data stream to the specified destination in near real time using the identified at least two routers and a packet-based transmission network.

In this method, additional features include:

wherein the fiber optic network may also be integrated with satellite transmission;

the step of using the graphical user interface to modify a previously scheduled service order by changing at least one of the following: the identity of the desired data stream; the service time; the at least one service circuit parameter; and the destination; and/or the step of using computer readable program code to monitor a status of the identified at least two routers used to transport the data and using the graphical user interface to display the status; and/or wherein the graphical user interface provides at least one pull-down menu for use in entering at least one of the following: the identity of the desired data stream, the service time, the at least one service circuit parameter, and the destination; and/or the step of using the graphical user interface to define a new type of service circuit by modifying the at least one service circuit parameter; and/or computer readable program code capable of automatically making the new type of service circuit thereafter accessible to the user via a pull-down menu; and/or the step of activating an alarm when at least one of the routers triggers an alarm condition; and/or the step of using computer readable program code to record a level of use of the transmission network by one or more users; and/or the step of using the graphical user interface to provide one or more users with an accounting of usage.

In another preferred embodiment, there is provided a system for controlling a transport of data across a fiber optic transmission network or an integrated satellite and fiber optic transmission network, said transmission network comprising a local POP location and a remote POP location, said POP locations each comprising equipment in operable association, said equipment comprising at least one digital router, a customer premises circuit on said router, at least one transcoder, a standards converter, a video gateway device, and an IP switch, said system comprising: (1) a graphical user interface used to input a service order comprising an identity of a data stream, a service time, at least one service circuit parameter, and a destination; (2) a database comprising (i) information relating to the service order, said service order information including the identity of the desired data stream and data relating to the availability of bandwidth needed to transport the desired data stream to the specified destination at the specified service time, and (ii) information relating to the operation of at least two of said plurality of routers in the transmission network, said operational information including data relating to configuration and operational status of a router, and data relating to future availability of a router to transport the desired data stream; and (3) computer readable program code used to automatically (i) access the database to identify at least two of the plurality of routers that are available to transport the desired data stream across the transmission network the specified destination at the specified service time and using the specified service circuit parameter; (ii) schedule the service order using the identified at least two routers to transport the desired data stream across the transmission network to the destination at the specified service time and using the specified service circuit parameter; and (iii) activate each of the identified at least two routers at the desired service time to transport the desired data stream to the specified destination in near real time using the identified at least two routers and a packet-based transmission network.

In a further preferred embodiment, there is provided one or more additional features, including:

the system further comprising computer readable program code used to modify a previously scheduled service order by changing at least one of the following: the identity of the desired data stream; the service time; the at least one service circuit parameter; and the destination; and/or, the system further comprising computer readable program code to monitor a status of the identified router used to transport the data and using the graphical user interface to display the status; and/or the system wherein the graphical user interface provides at least one pull-down menu for use in entering at least one of the following: the identity of the desired data stream, the service time, the at least one service circuit parameter, and the destination; and/or the system further comprising computer readable program code capable of defining a new type of service circuit by modifying the at least one service circuit parameter; and/or the system further comprising computer readable program code capable of automatically making the new type of service circuit thereafter accessible to the user via a pull-down menu; and/or the system further comprising computer readable program code capable of displaying the alarm via the graphical user interface when at least one of the routers triggers an alarm condition; and/or the system further comprising computer readable program code capable of accessing the database to record a level of use of the transmission network by one or more users; and/or the system where in the graphical user interface is capable of providing one or more users with an accounting of usage.

The foregoing methods and systems offer the ability to remotely provision, operate, control, manage, analyze, and monitor data transmission equipment used in the transport of data between remote locations in real time or near real time. In a preferred embodiment, the present invention allows transmission of a data stream between remote locations via a packet-based data transmission facility, thereby avoiding the need to use and maintain circuit-switched facilities or private dedicated and other conditioned telecommunications circuits between locations to transport audio and video data in real time or near real time. The present invention also allows users to reconfigure quickly and automatically the data transmission network for a variety of simultaneous and successive data transfers between remote locations.

BRIEF DESCRIPTION OF THE FIGURES

FIG. 1 depicts the layout of a data transmission system including originating and terminating POP locations, customer locations, and interconnecting facilities.

FIG. 2 depicts a typical layout of equipment in a POP Location, where data transmission equipment used in the present invention resides. This figure shows equipment connections that may be used to transfer data from a user through a local POP Location for transmission to a remote or destination POP Location.

FIG. 3A: FIG. 3A depicts a sample "Order Entry" user interface that may be used to enter a data transmission order.

FIG. 3B depicts a sample user interface that may be used to review and/or modify a particular type of service circuit.

FIG. 3C: FIG. 3C depicts a sample "Network Status" user interface that shows the network status for pending and/or active data connections.

FIG. 3D: FIG. 3D depicts a sample "Network Error Segment" user interface that provides detailed information on the equipment and facilities used to carry out a data connection including equipment that is in a failed state or another form of alarm condition.

FIG. 3E depicts a sample "Device Error Detail" user interface that provides information specific to an equipment alarm condition.

FIG. 4 depicts a sample flow of data being transported through a POP Location.

FIG. 5 depicts a network manager topology for the software control system that is used in the operation, maintenance, administration, and provisioning of the network equipment.

DETAILED DESCRIPTION OF EXEMPLARY EMBODIMENTS

Figure 1:
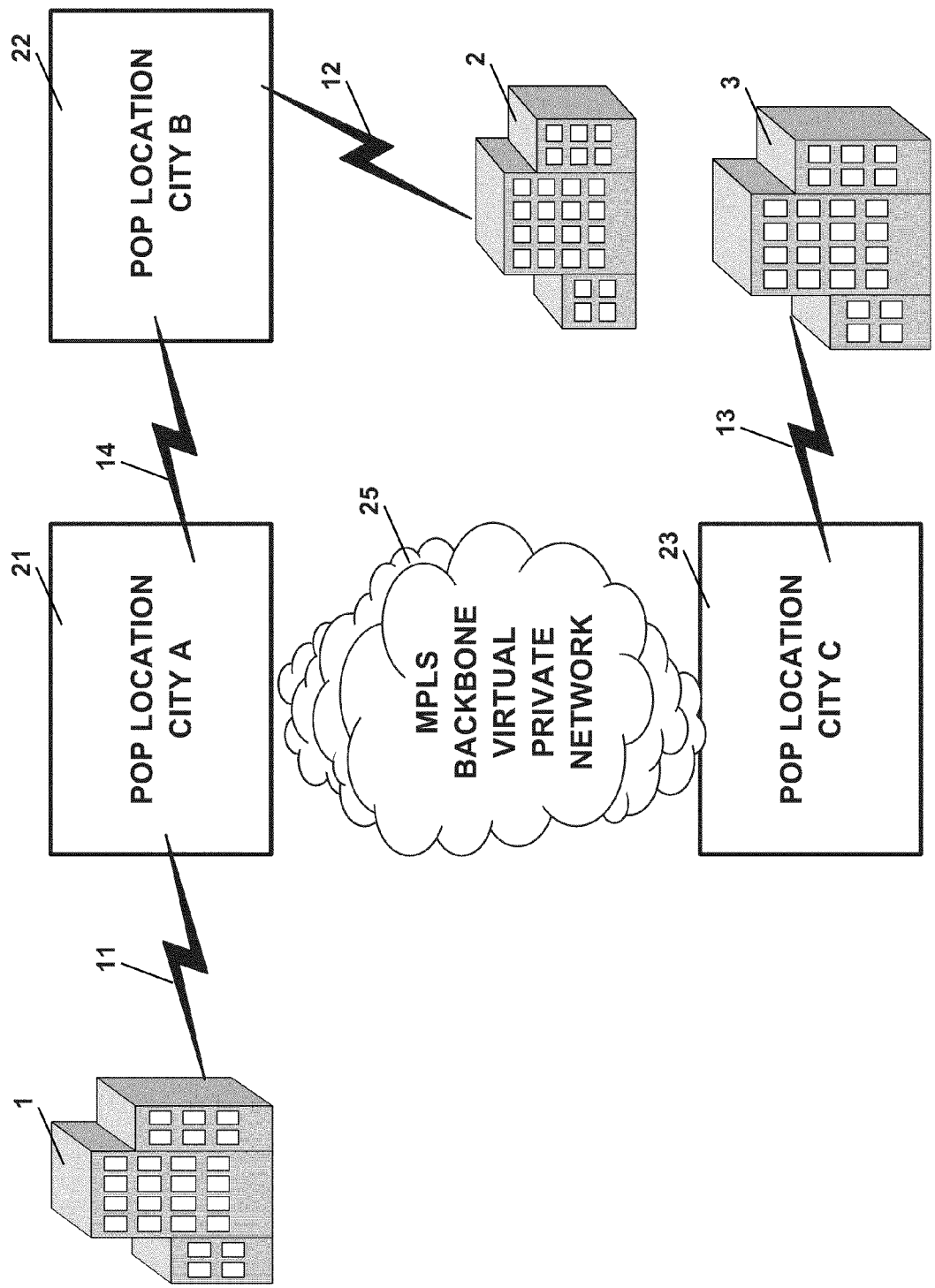
FIG. 1.

The present invention is directed to a system and method for controlling a data transmission network. The invention contemplates use of a data transmission network and a software control system.

In one embodiment, the data transmission network includes a packet-based network that includes transmission equipment such as digital routers, transponders, packet gateway devices, packet-based switches, and a transmission medium. The transmission equipment is set up in various locations known as "point of presence" or "POP" locations. Each POP location has a data processing system, which can include one or more digital routers, one or more MPEG 2 transcoders, MPEG 2 encoders and decoders, one or more packet gateway devices, and may also include standards converters, as well as analog-to-digital (A/D) and digital-to-analog (D/A) converters. Signal monitoring equipment, specifically MPEG, video and audio signal monitoring equipment, and device communications equipment may also be included. Each POP Location may also contain an IP Switch, or a Layer 2/Layer 3 Switch. In a preferred embodiment, data is transmitted between POP locations using a packet-based transmission medium, particularly a Multi-Protocol Label Switching ("MPLS") Virtual Private Network ("VPN"). A private packet-based communications facility, such as the MPLS backbone VPN provided by Level 3 Corporation, may be utilized to provide a specific Quality of Service ("QoS") that allows for the carriage of video and audio in real time or near real time (i.e., with delay that is typical with long haul data transport facilities used in the carriage of live broadcast video).

The software control system is used to operate, manage, control, provision, configure, administer, analyze, monitor, and support the data transmission network resources that are used to transport data between two POP centers or among multiple POP centers or locations. In a preferred embodiment, the Internet may be used by the software control system to communicate with the hardware equipment (e.g., digital routers, transponders, packet gateway devices, and IP switches) that comprises the data transmission network.

The software control system provides a graphical user interface through which the user interfaces with the data transmission network. The software control system comprises computer readable program code to allow for remote operation, management, control, provisioning, configuring, administration, analysis, monitoring and support of network equipment. The software control system uses one or more computer databases. In a preferred embodiment, these databases include an equipment database containing operational information related to the equipment located in each POP center assembly, and an order database containing information related to a user-entered order for a data transport connection. The databases may be controlled and updated via software programming (i.e., computer readable program code) as equipment is provisioned, operated, and monitored and as orders are entered, modified, performed, and/or deleted. The software control system may be used to monitor equipment status before, during, and after the equipment in each POP location is used for the transmission of data. System usage information may also be monitored for billing purposes. These functions may be performed by separate or integrated software programs and also through use of separate or integrated computer databases.

Through use of the present invention, a user in one location, or many users located in multiple locations, can remotely operate, manage, administer, and provision the data transmission network equipment located in the POP locations. In a preferred embodiment, users access the software control system and data transmission equipment via an Internet website and computer login procedure.

The present invention may be used for data transmission applications where the transmission of real time, or near real time, video and/or voice (i.e., a particular Quality of Service, or QoS) is desired or required. In one embodiment, the invention allows connections between different analog and digital video formats, including High Definition Television (HDTV), uncompressed 270 Mbps, variable bandwidth MPEG 2 services, and data services for critical applications demanding an enhanced QoS. The invention may be used to support full-time dedicated bandwidth for data services, and on-demand data connections for special events, breaking news, and ad hoc needs. The invention also may be used to support services to locations unreachable by copper and fiber through use of satellite technologies.

The invention comprises, in one aspect, a method for controlling a data transmission network to ensure network resources are reserved for a predetermined date and time to enable the transmission of video and/or voice data, in real time, near real time, or on-demand. The aspects of the invention that provide a user-friendly graphical user interface or GUI system reservation interfaces reduce operational costs in provisioning system resources and improve network utilization and control. Through use of a packet-based connection between POP locations, the system and method of the present invention avoids the need to purchase private-line services and avoid telecommunications switching costs.

The invention provides one or more of the following advantageous features: A user may provision network equipment resources for data transmission; the user may also check network availability before scheduling current and future data transmission connections; the user may monitor the status of the data transmission connection in real time and analyze the availability of bandwidth on a particular data route; the user may also query and analyze in real time (or near real time) hardware devices used to transmit data as well as monitor data signal quality; the software control system may utilize device polling and software traps to monitor the status of the hardware devices, and the user may retrieve pricing and billing information for particular data connections associated with the user, as the system allows viewing of summaries of ongoing and historical usage and billing. These features are described in greater detail below.

The software control system may include the following functionality:

Order Entry and System Availability. A user can enter an order for the transmission of data for a future data transmission connection and/or check the availability of network equipment and system resources prior to entering an order.

System Monitoring and Diagnostics. A user can query and analyze in real time (or near real time) the particular equipment being used to transmit data. Such diagnostic information may be helpful when analyzing and remedying equipment alarms and service interruptions, as the system can provide detailed information on the exact nature and location of a specific interruption and equipment alarm. The software system also allows monitoring of data signal quality, including the measurement and verification of signal levels. In addition, the software control system monitors continuously the equipment in each of the POP Locations in the background, i.e., with no user intervention, and provides equipment status and alarm information to users in accordance with predetermined settings.

Account Management. A user can view summaries of ongoing and historical usage and associated billing. A user can also request pricing for services and transmission scenarios to determine the most desired approach.

Throughout this disclosure, applicants may refer to journal articles, patent documents, published references, web pages, information available in databases, and other sources of information. One skilled in the art can use the entire contents of any of the cited sources of information to make and use aspects of this invention. Each and every cited source of information is specifically incorporated herein by reference in its entirety. Portions of these sources may be included in this document as allowed or required. The description and examples that follow are merely exemplary of the scope of this invention and the content of this disclosure. One skilled in the art can devise and construct numerous modifications to the examples listed herein without departing from the scope of this invention.

Data Transmission Network.

FIG. 1 depicts a typical system layout including originating and terminating POP locations 21, 22 and 23, customer locations 1, 2 and 3, and interconnecting facilities 11, 12, 13 and 14. The POP locations may be located in different cities, and may even be in different countries such as London, England and New York City, USA. Customer premises locations 1, 2 and 3 may represent cable and broadcast station facilities, satellite uplink and downlink facilities or teleports, production and post-production studios, sports arenas, stadiums and other public venues, production trucks, cable head-ends, telecommunications company central offices and switching hubs. Specific customer premises locations may include the Pac Bell Hubs in Los Angeles and San Francisco, Calif.; the Verizon TVOC in Boston; and the BT Tower in London. Public and private-owned switching hubs may include the Crawford Hub in Atlanta, Ga., and Waterfront Communications and the Beers' Switch in New York City.

As depicted in FIG. 1, the data transfer between customer premises 1 and the City A POP Location uses interconnecting facility 11; the data transfer between the City A POP Location and the City B POP Location uses interconnecting facility 14; the data transfer between the City B POP Location and customer premises 2 uses interconnecting facility 12, and the data transfer between the City C POP Location and customer premises 3 uses interconnecting facility 13. Transmission via interconnecting facilities 11, 12, 13 and 14 may be performed via a TV1-type analog circuit, SDI Digital Video circuit, private line Ethernet, a DS3/SONET connection, or any high-speed connection that can support the necessary data speed. TV1 is a standard Telco video product that stands for TV1 Broadcast Video circuit (which may be a tariffed service offering). SDI is a variation of the TV1 product that offers a Serial Digital Interface as opposed to the analog interface of the TV1 circuit. Interconnecting facilities such as microwave and satellite links may also be used as a means to transmit signals from a customer premises or alternative location. The data connection between City A POP Location 21 and the City B POP Location 23 is made via the Multi-Protocol Label Switching (MPLS) Virtual Private Network (VPN) Internet Backbone 24.

The MPLS Backbone VPN 24 can also be interconnected with POP Locations in additional cities and in other remote locations. In a preferred embodiment of the present invention, the MPLS VPN Backbone 24 is a private Internet backbone connection that implements the MPLS "Martini Draft" Standard. Level 3 Communications has published on its website a paper that discussed the benefits of the MPLS "Martini Draft" Standard. See "MPLS Private Network Technology and Level 3," available at http://www.level3.com/userimages/DotCom/pdf/MPLS_whitepaper.pdf>. This private line packet-based Internet backbone connection supports the Quality of Service (QoS) requirements for high-quality real time (or near real time) video and audio transmission.

MPLS technology enhances the performance of IP networks and also improves their manageability. MPLS can be used to enable the internetworking of diverse services. Recent developments have enabled MPLS to be able to support services with a sufficiently high level of availability and quality of service (QoS) as may be implemented in an embodiment of the present invention. MPLS works by appending a label to each packet on the underlying network. This label enhances IP network performance by allowing packets to be routed at high speed to the proper egress interface on a router. The label also associates packets with a continuous path through the network. This continuous path is typically referred to as the label switched path (LSP) and is a concept that enhances management of the network. The label also specifies the treatment of packets on an LSP by the network. MPLS features, such as the capabilities for load balancing, flow control, explicit routing and tunneling are also important from a QoS perspective.

The MPLS VPN Backbone 24 in FIG. 1 is not directly configured by the software control system. Instead, where data transfer is conducted using this connection, there is a layer 3 Internet Protocol (IP) network that resides "on top" of the physical layer (i.e., layer 1) backbone and is used to transmit the data over the IP network as packets. The network may also be configured to reside on top of layer 2 networking topologies such as SONET or ATM. The layer 3 IP network can implement Open Shortest Path First (OSPF) as the routing protocol on top of the layer 2 networks that are traversed. The interface between the IP gateway and the IP Switch can be supported by Category 5 10/100 Mbps Fast Ethernet connection or by Gigabit Ethernet fiber optic connections, each of which may be employed simultaneously depending on the POP location and specific user application.

Figure 2:
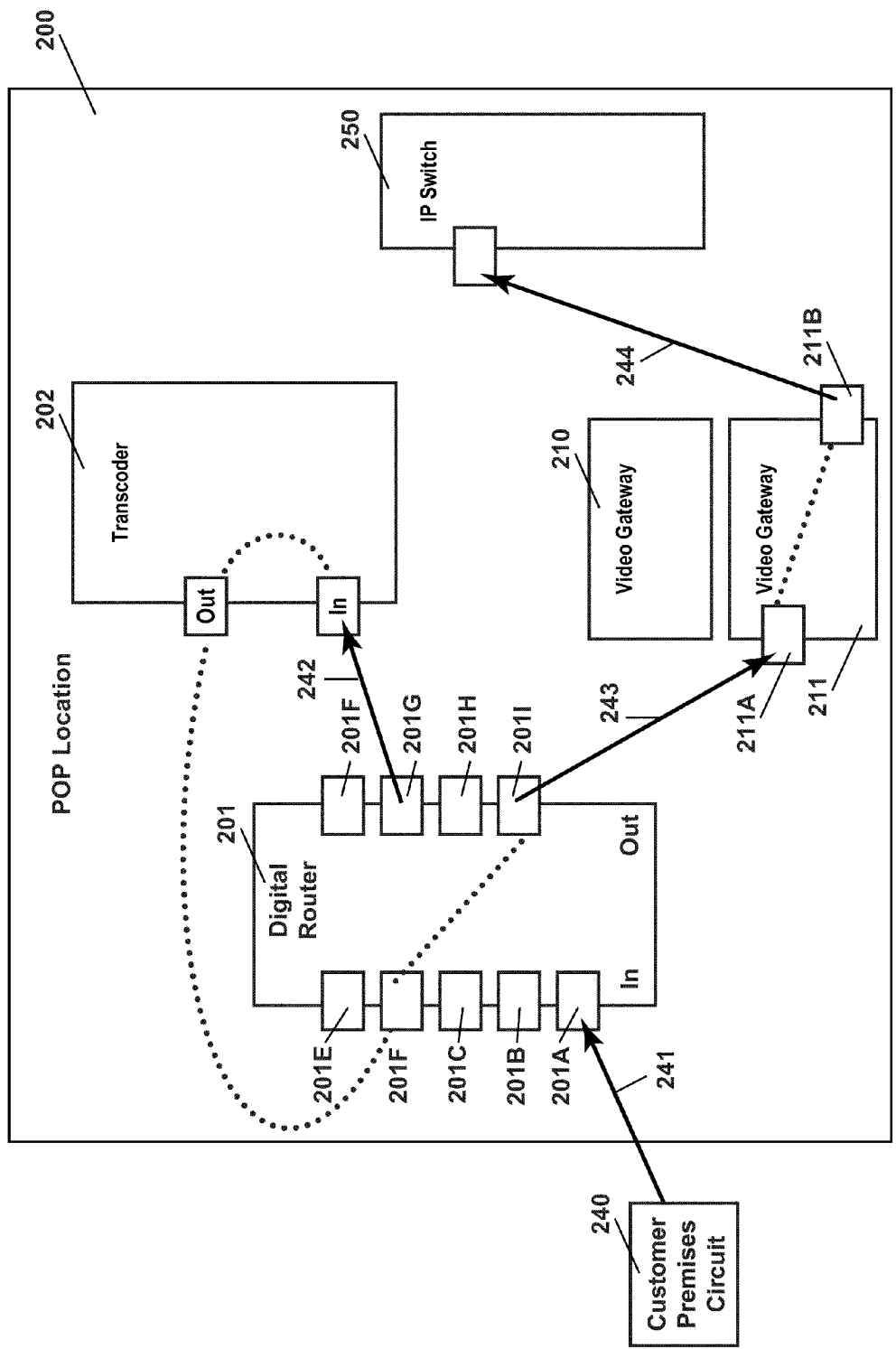
FIG. 2.

The POP Location. FIG. 2 depicts a typical layout of data transmission equipment in a POP Location. The equipment located in the POP Location 200 includes the Digital Cross-Connect or Router 201, a Transcoder 202, Video Gateways 210 and 211, and an IP Switch (or Layer 2/3 Switch) 250. In some cases an IP Switch also may be located at a customer premises location. FIG. 2 shows the connections that are made inside of a POP Location when it is receiving data from a local user circuit.

As depicted in FIG. 2, Customer Premises Circuit 240 provides data to the POP Location 200, and IP Switch 250 provides the data connection to the private MPLS VPN Backbone. Inside the POP Location 200, the customer data arrives on facility 241 and is connected to an input port 201A on the Digital Router 201. The software control system programs a cross-connect in the Digital Router 201 so that input port 201A is connected to output port 201G that is coupled to Transcoder 202. Transcoder 202 performs signal compression and signal encoding and decoding functions. The data signal exits from an output port on the Transcoder 201 and is fed back into a second input port 201D on the Digital Router 201. The software control system programs a second cross-connect in the Digital Router 201 so that the second input port 201D is connected to output port 201I that is coupled to Video Gateway 211 at input port 211A. The Video Gateway receives the data stream and converts the format into IP packets for transmission to the remote POP Location over the MPLS VPN. Output port 211B of the Video Gateway 211 connects to the IP Switch 250 via link 244. The IP Switch places the data onto the MPLS VPN Backbone for transmission. The packetized data contains the address information that directs the packets to the remote POP Location, or POP Locations in the case of a multipoint connection.

A remote or destination POP Location that receives the packetized data representing the signal originally transmitted by the Customer Premises Circuit 240 and routes the data signal in reverse direction to that depicted FIG. 2. Where the destination POP Location contains similar equipment to that depicted in FIG. 2 (e.g., a transcoder, video gateway and digital router), the signal enters the remote IP switch and is sent through a video gateway and transcoder using connections enabled by a digital router. The destination POP Location then sends the signal to the remote customer location in the requested format. The signal may be transmitted to the customer location using one or more of the facility types outlined above.

Standards Conversion. In certain instances, a data signal to be transmitted across the network may need to be converted from the format received at the originating POP Location to another format prior to delivery to the customer location by the destination POP Location. For example, if an end user in New York transmitting a video signal in the NTSC format wants the signal delivered to a customer location in London in the PAL format, the system can provision the service such that the data may be passed through a standards converter. In this case, the software control system provisions the service such that a signal standards converter is used to change the signal format from NTSC to PAL. A single standards converter located in the equipment assembly in the New York POP location or the London POP location may be used to perform the standards conversion. Typically, if no signal conversion is needed, none is provisioned.

Signal Compression. Where a compressed type of service (e.g., MPEG 2 compressed) is needed, compression equipment (e.g., a signal transcoder) may be incorporated into the signal path and be used to provide the desired end-to-end service. Where there is no need for data compression, such as where the user has already compressed the data before transporting it to a POP Location, the software will typically provision the equipment in the POP Location to pass the signal through the POP Location without using any compression equipment. When the remote customer location requires an uncompressed data signal, the remote POP Location may insert into the signal path decompression equipment prior to delivery to the remote customer location.

The POP Locations can support a wide variety of signal interface formats to and from the user. Many of these interface formats are industry standards representing various technologies, such as analog, NTSC and PAL standards, digital DVB-ASI, MPEG and SMPTE. The interface standards typically describe physical layer characteristics that make up the signal itself such as electrical signal parameters, signal coding and bandwidth.

The types of signal conversions that occur are related to the type of service that is ordered. While there are types of conversions that almost always occur in the normal course of operation, there are types of conversion that only occur when needed to provide certain types of service. When providing a compressed service, for example, DVB-ASI to IP encapsulation is typically carried out. DVB-ASI to IP encapsulation also occurs when receiving a pre-compressed transport stream from a customer premises location. Analog-to-Digital (A/D) and Digital-to-Analog (D/A) signal conversion takes place on an as needed basis. Format conversions such as PAL to NTSC and vice versa are typically used when services are transmitted between countries whose broadcast standards are different. Equipment that provides this functionality is available from a number of manufacturers, including Snell & Wilcox, Leitch, Video Products Group, and Videotek.

Different hardware equipment may be used to support the same signal conversions and connections needed for a specific circuit provisioned on the data transmission network. For example, in a separate embodiment of the present invention, a separate MPEG 2 Encoder and separate MPEG 2 Decoder may be used in place of a Transcoder.

In addition, connections between the equipment may vary from what is depicted in the Figures. For example, in another embodiment, through using a Transcoder's Real Time Protocol (RTP) interface, the Transcoder can interface directly to the IP Switch without first passing the signal through the video gateway.

The system may also be used to interface with a raw data stream, such as an MPEG 2 data stream using a DVB-ASI signal format. Typically, in this case, the signal has already been compressed prior to delivery to the POP Location where it will be transmitted across the network in the same form to a remote location.

When Analog-to-Digital (A/D) and Digital-to-Analog (D/A) converters are used, they will typically interface to other equipment in the POP Location through the digital cross-connect or router. The A/D and D/A converters tend to be used as circuit interfaces between analog circuits and the digital equipment in the POP location. See FIG. 4. Where a customer is delivering to an origination POP Location and delivering to a destination POP Location a compressed digital DVB-ASI stream, A/D and D/A converters will usually not be used.

Software Control System.

The software control system may include one or more of the following features, which are described in greater detail below: Order Entry and System Availability, System Monitoring and Diagnostics, and Account Management.

System Availability and Order Entry. In a preferred embodiment of the invention, the software control system provides a graphical user interface or GUI and performs one or more actions in response to user-entered instructions. The user interface is used to accept and process orders for data transport connections between customer premises locations.

Figure 3A:
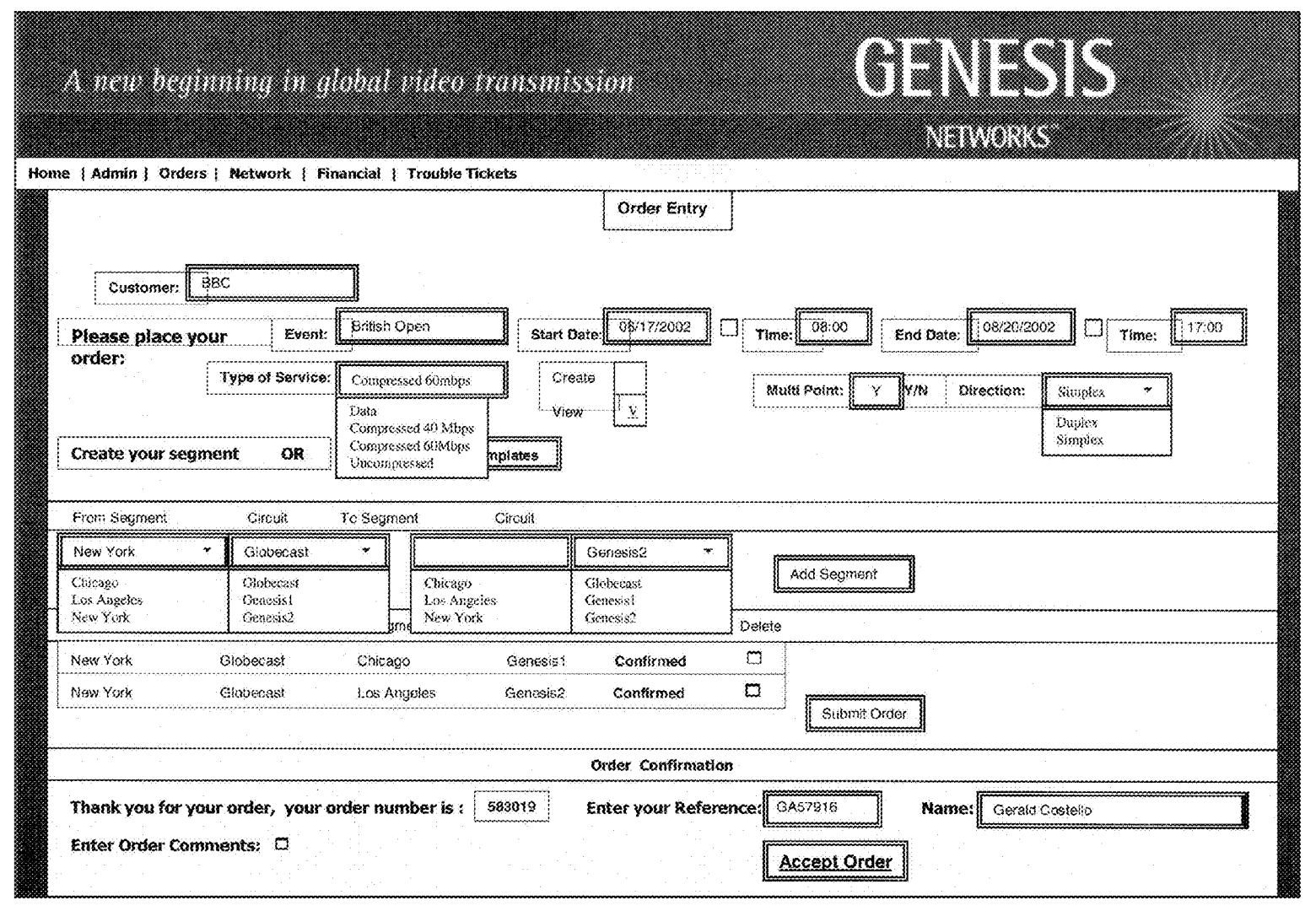

A sample order entry interface is depicted in FIG. 3A. Through use of this sample interface, the user can enter the following information:

(1) The POP locations between which data is to be transferred (e.g., London and New York);

(2) Whether the data transfer is multicast (or multipoint) or point-to-point. When a multicast service is scheduled, additional end points are selected; specifically, the service would be constructed by the software control system to transmit from City A and deliver to City B, City C, etc. In this instance, the software system controls the data transmission network to enable transmission of the same transmit content to each designated receive point (i.e., City B, City C, etc.);

(3) The data transfer start date and time and end date and time, and (4) The type of data service. Entry of the type data service includes identification of one or more service circuit parameters, such as the data rate (e.g., 4 MB, 24 MB), data compression, and the number of channels. Users are also able to design a different service circuit based on a pre-configured set of parameters or may begin with a clean slate.

Some examples of particular service circuit parameters used in an embodiment of the present invention are 420 (i.e., 4:2:0) ND, and 422 (i.e., 4:2:2) LD. The 4:2:0 and 4:2:2 parameters represent ratios used by the compression algorithm that indicate how the video portion of the signal is compressed. The ratio is a relation between how the "white" and "color" signals are handled in the compression processes. The ratios represent a tradeoff of signal quality vs. information rate (i.e., bandwidth). The 4:2:0 service parameter requires less bandwidth than the 4:2:2 service parameter but typically provides lesser color quality. The ND and LD parameters are delay parameters that may be selected for a given type of service. ND represents Normal Delay and LD represents Low Delay. These parameters are selected by the user to meet particular needs. A customer may, for example, choose a particular delay based upon the type of programming. A customer providing a two-way videoconference would typically choose a Low Delay mode for better service.

Figure 3B:
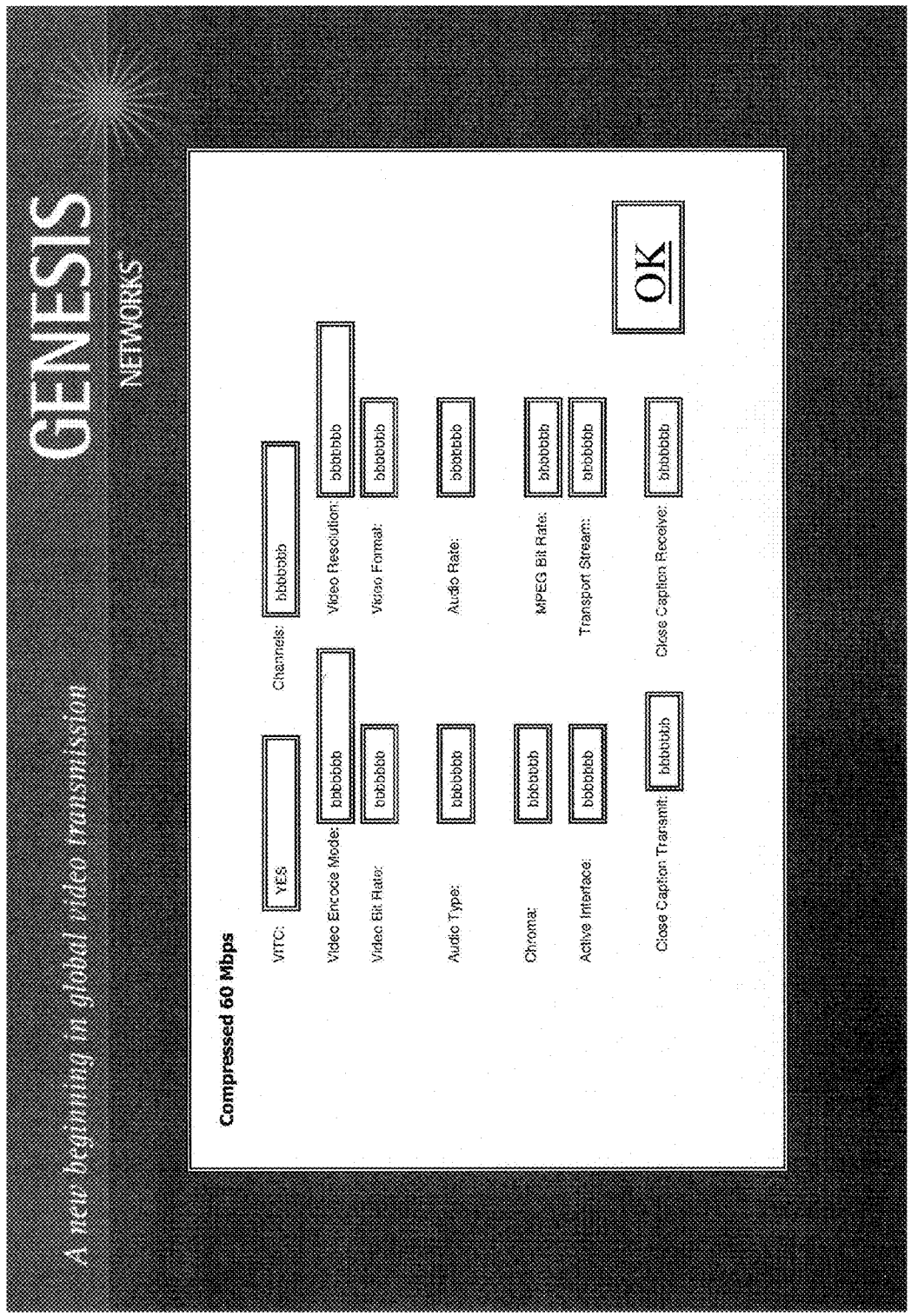
FIG. 3B.

The order entry system may be used to allow users to choose a pre-configured set of service circuit parameters or allow users to design a different service circuit that may be added to the service circuit database. FIG. 3B depicts a sample user interface showing some of the service circuit parameters that may be programmable. This sample user interface may also be used to review specific service circuit parameters for a particular type of service circuit.

Other service circuit parameters can include: VITC, which stands for Vertical Interval Time Code. The VITC parameter assigns a specific time in hours, minutes, and seconds to each vertical blanking interval in a video recording, along with a frame number. A "channels" field represents the number of audio channels available to the service. For example, 2 channels of audio would be needed to transmit 1 channel of stereo, and 4 channels of audio could transmit 2 Stereo pairs. Other circuit parameters that may be varied include the video encode mode, video bit rate, video format, audio type, audio rate, chroma, MPEG bit rate, active interface, closed captioning, and the transport stream. Any one or more of these parameters may be modified to define a new type of service circuit. FIG. 3B depicts a sample user interface that may be used to review and/or modify a particular type of service circuit.

In a preferred embodiment, information entry via the user interface may be performed through the use of pull-down menus. These pull-down menus contain a list of pre-defined entries that may be selected such as for use in scheduling a particular service order or entering other information. The predefined entries can simplify the order entry process for the user by making available particular entry information that is used more than once. Some of the information that may be presented via pull-down menus include the available POP Locations, start and end dates and/or times for a scheduled service order, the type of service circuit, and/or the particular parameters that comprise a particular type of service circuit.

Database Management. The reservation process is conducted by the software control system, which relies upon use of a computer database. In a preferred embodiment, the Microsoft SQL software database program is implemented. In a general aspect, a computer database is used in the ordering process to manage the following information related to a specific order: the POP locations, multicast or point-to-point transmission, the start date and time and end date and time, the type of data service, equipment located in each POP Location, the configuration and status of the equipment, the particular settings for the equipment used to carry out the order.

In one particular embodiment, following entry of a request for service, the software control system checks the equipment database for availability of the equipment at each of the POP locations that are needed to satisfy the requirements for the order. The system reserves the necessary equipment in each of the desired POP locations for the desired time period. This may include the reservation of the Transcoder 202, Digital Router 201, and Video Gateway 211 as shown in FIG. 2 as well as other equipment, such as A/D and D/A converters and standards converters, as needed to fulfill the order. This reservation process may be performed automatically via software control, i.e., without any further user intervention beyond the order entry process. The software control system may use a database table to manage the reservation entries.

If equipment needed for a particular order has already been reserved for the requested date and time period, the software control system can search the equipment database for the next available piece of equipment to satisfy the requirements of the order. This process is carried out for each piece of equipment needed to provide the requested service. The process is completed when the equipment needed is appropriately reserved. If no available equipment can be identified to provide the requested data connection at the date and time requested or if the required bandwidth is not available at the requested date and time, the system may inform the user that the service is unavailable.

The system operator may be provided with information about each order and is alerted when a specific order cannot be placed or is otherwise rejected. The service provider may use the information to make systems engineering decisions, such as whether to install additional equipment at certain POP locations.

Computer databases are also used to maintain and manage each piece of equipment in the data transmission network. Many equipment types have a unique IP address that is used by the software control system to activate, deactivate, manage, analyze, administer and provision the equipment. Equipment that does not have an IP address as part of their characteristics may be assigned an IP address. In some cases, where an equipment chassis (frame) contains several cards or modules, a collection of such equipment may share a single IP address. An equipment chassis containing more than one individual card or module may have a single IP address.

Configuration information can also be maintained for each piece of equipment, including the equipment configuration that is needed to fulfill each data transmission order. The system maintains the same type of information for the same types of equipment—information that is required to inventory, reserve, provision, configure, query, control and manage each different type of equipment. This information includes one or more of the following: IP address, gateway and net mask address, DNS name, serial number, device name, device code, location, supporting power equipment, device status (e.g., active or inactive, managed or unmanaged) video router port connections, IP router port connections, control cabling information, device owner, certain default settings, etc. Detailed identification information for each device may be stored in a POP Device Profile. In addition, physical identification information may also be stored for each POP Location, including address location and contact information.

When the software control system accepts an order for service, it reserves the necessary equipment resources to provide the service ordered by the user for the requested date, time, and duration. In a preferred embodiment, the resources may be taken out of working inventory for the date, time and duration required for the order, at the time the order is accepted to prevent over subscription of equipment. The user may be provided with an identification mechanism to aid in monitoring the order status, such as an order reference number.

Information presented to the user can include the status of the facilities and equipment used to carry the data. The GUI may provide the user with a network transmission status display, showing the status of the service from the time it is booked (i.e., in a "pending" state) to the time the service has become "active" (i.e., at the start time) until it eventually finishes. The user can also monitor the status of an active data connection through remote monitoring tools. When a problem occurs, the network transmission status changes and displays and/or otherwise alerts the user with an appropriate indication (i.e., via activating an alarm). A sample "Network Status" user interface that indicates the status of data transmission network equipment and facilities is shown in FIG. 3C.

While the user may monitor the status of those pending and active data connection orders that were entered by the user or are otherwise made available to the user, the system operator can monitor the status of all pending and all active data connection orders that will be and are being carried through the data transmission network.

If a user cancels an order, the equipment resources that had been reserved for the requested date, time and duration are automatically freed up by the software control system for other orders. The software control system can monitor each order and cancellation and may implement a mechanism whereby users are charged a penalty for canceling an order. For example, the user may be charged the total fee for the order (or some portion of the fee) if the equipment is not used for another order during the same date and time and/or if the order is cancelled too close to the originally scheduled time.

In one embodiment, the software control system database maintains a dynamic connection table that keeps records of all resources associated with each data transport order that is pending or active. Information associated with each order is maintained by the database. If a particular piece of network equipment or a particular interconnecting facility becomes disabled or enters a failed state, the software control system can offer information on the pending orders that will be affected by the unavailability of the equipment to allow for re-routing via use of alternative equipment and facilities. The software control system is also capable of performing the task of automatic restoration in the event an active service connection enters a failed or disabled state. Service restoration can also be supported via manual intervention.

Bandwidth Monitoring. In a preferred embodiment, after a user places an order for service, the same or similar equipment to what will be used for the actual data transmission service may be activated to generate traffic on the network. Based on the generated traffic, it is possible to make a prediction of how the traffic will flow. In this way, aggregate bandwidth out of and into each POP Location may be monitored. Information may be placed into the database defining the bandwidth capacity of the connection within the network. This information may be used by the software control system to prevent any over subscription of bandwidth and to define the amount of capacity available to the system to utilize between any two given points. When an order is being placed, the system can determine how much capacity is available between the respective POP locations and either rejects the service order if there is not enough capacity available at that time or accepts the service order by reserving the appropriate bandwidth and taking that amount out of the connection point's available bandwidth pool. Each POP Location contains at least one port to the packet-based network transmission facility. In cases where higher capacity out of and/or into a POP Location is needed, additional ports to the packet-based network may be added. Ports include 100 Mbps and 1 Gbps connection into the packet-based backbone. Connections via high capacity private line circuits, such as DS3 and OC3 (i.e., SONET) circuits, may also be used.

In this embodiment, a database within the software control system may be used to keep track of the total network bandwidth that is available into and out of each POP location. Within the database, a separate bandwidth table may be implemented to keep track of the bandwidth needed for each particular order as well as the total bandwidth at each instant of time. Thus, the aggregate bandwidth available into and out of each POP location and the bandwidth allocated to each active and pending service are each stored.

Data Transmission Network Modification. Equipment resources can be added, deleted, and/or modified by a user or system operator by using a device creation menu. In a preferred embodiment, the software control system recognizes the addition of new equipment and can configure the equipment remotely. Entire POP locations can also be added, deleted or modified. The added equipment or POP Location becomes part of the data transmission network and may be used to provide data transport services.

User Interface Access. Access to the user interface may be restricted and require entry of a login and password. Access to the user interface can be further restricted to different areas of the user interface by user name and/or user group type, such as engineering, programming and billing groups. For example, the system access provided to the engineering department may be limited to those areas of the computer interface used in the entry of new orders and equipment, and the access provided to the billing department may be limited to the account management section of the interface that contains the user's usage history so as to verify charges on an invoice.

Order Activation. In an embodiment of the present invention, when it is near to the time for a data transmission connection order to be activated, the equipment to be used to provide the data connection is polled by the software control system to ensure that it is in working condition. The equipment is then activated to provide a data transmission path, which is kept active until the deactivation time is reached. This activation process and subsequent deactivation process occur automatically (i.e., controlled by the software control system without any user intervention) when an order for service is accepted by the software control system.

Figure 4:
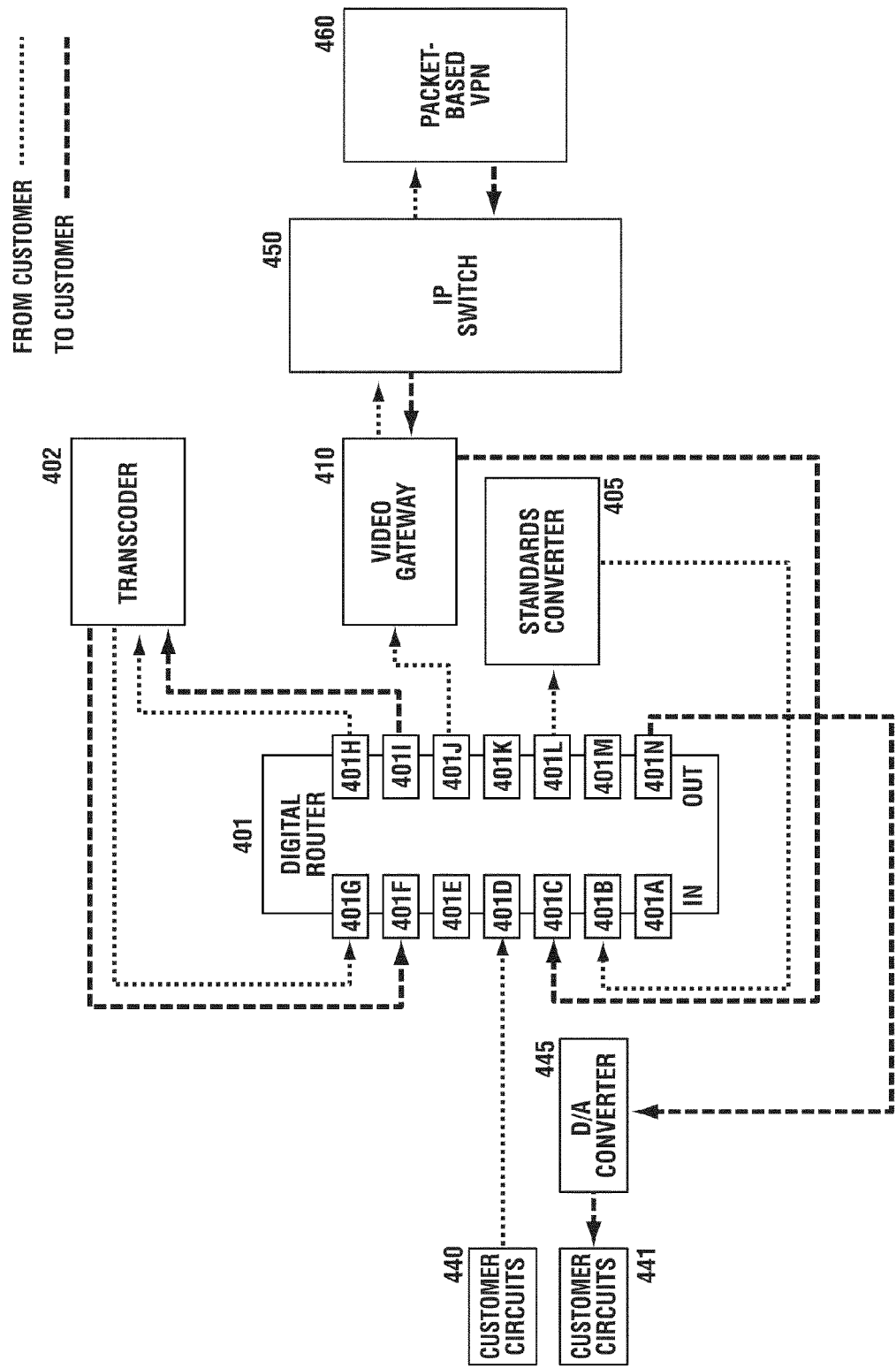
FIG. 4.

An Example of Data Transport Through A POP Location. FIG. 4 depicts how data transmission equipment may be configured to transport an outbound data signal or an inbound data signal according to an embodiment of the present invention. The outbound data signal path indicates how data is transported from the customer location through the POP Location and onto the Packet Based VPN for transfer to the appropriate remote POP Location. The data from the customer location on Customer Circuit 440 enters the Digital Router 401 at port 401D. Digital Router 401 has in place a cross-connect from port 401D to port 401H. Output Port 401H is used to transfer the outbound data to Transcoder 402. After the outbound data signal leaves the Transcoder 402, it re-enters the Digital Router 401 at port 401G, which is internally cross-connected to port 401L. The outbound data is then delivered to Standards Converter 405. After the outbound data signal leaves the Standards Converter 405, it re-enters the Digital Router at port 401B, where it is internally cross-connected to port 401J. The outbound data is next sent through the Video Gateway 410, and then through the IP Switch 450 before being placed on the Packet Based VPN 460 for transport to the remote POP Location.

The inbound data signal path, which is also depicted in FIG. 4, shows how data transported from a remote POP Location onto the Packet Based VPN is carried through the destination POP Location to the appropriate customer premises location. As shown in FIG. 4, the inbound signal is sent from the Packet Based VPN 460 to the IP Switch 450, and is then into the Video Gateway device 410. After the signal leaves the Video Gateway Device 410, it enters the Digital Router 401 at port 401C. Within the Digital Router 401, port 401C is internally cross-connected to port 401I. Digital router output Port 401I is used to transport the data to the Transcoder 402. Once the outbound data exits the Transcoder 402, it re-enters the Digital Router 401 at port 401F. The inbound signal, in this case, is converted to an analog signal prior to delivery to the customer location. Accordingly, Port 401F is internally cross-connected to port 401N, which interfaces to D/A Converter 445 before delivery to the customer location on Customer Circuit 441.

System Monitoring and Diagnostics. The software control system may be used to perform diagnostic and monitoring processes without any user intervention, i.e., as background processes. The software control system polls periodically each piece of data transmission equipment on the network. The user can also query, monitor, and analyze in real time (or near real time) the particular equipment being used to transmit data. In contrast to the data transmission network, which uses a private packet-based backbone that provides a specific Quality of Service (QoS), the equipment query, monitoring and analysis processes are performed using the public Internet in a preferred embodiment of the present invention. In other embodiments, the query, monitoring, and analysis processes may also use the private packet-based backbone connection. This latter approach is analogous to what is called "in band" monitoring and control management.

System monitoring and diagnostic information is helpful when analyzing and remedying equipment alarms and service interruptions. The system can provide detailed information on the exact nature and location of a specific interruption and equipment alarm. The system also allows monitoring of data signal quality, including the measurement and verification of signal levels.

Alarm conditions include atypical equipment conditions, such as a total equipment failure, the failure of some portion of the equipment's capacity, the inability of equipment to respond to status requests, the inability to communicate with a particular piece of equipment, and the inability of the equipment to support monitoring capabilities. Alarm conditions also include the failure of an interconnecting facility, which may be indicated via the lack on an incoming signal on a particular input port of a digital router.

The user can create new alarm types by modifying existing alarm triggers and by creating entirely new alarm triggers. Alarm severity or level can also be modified.

Figure 3E:
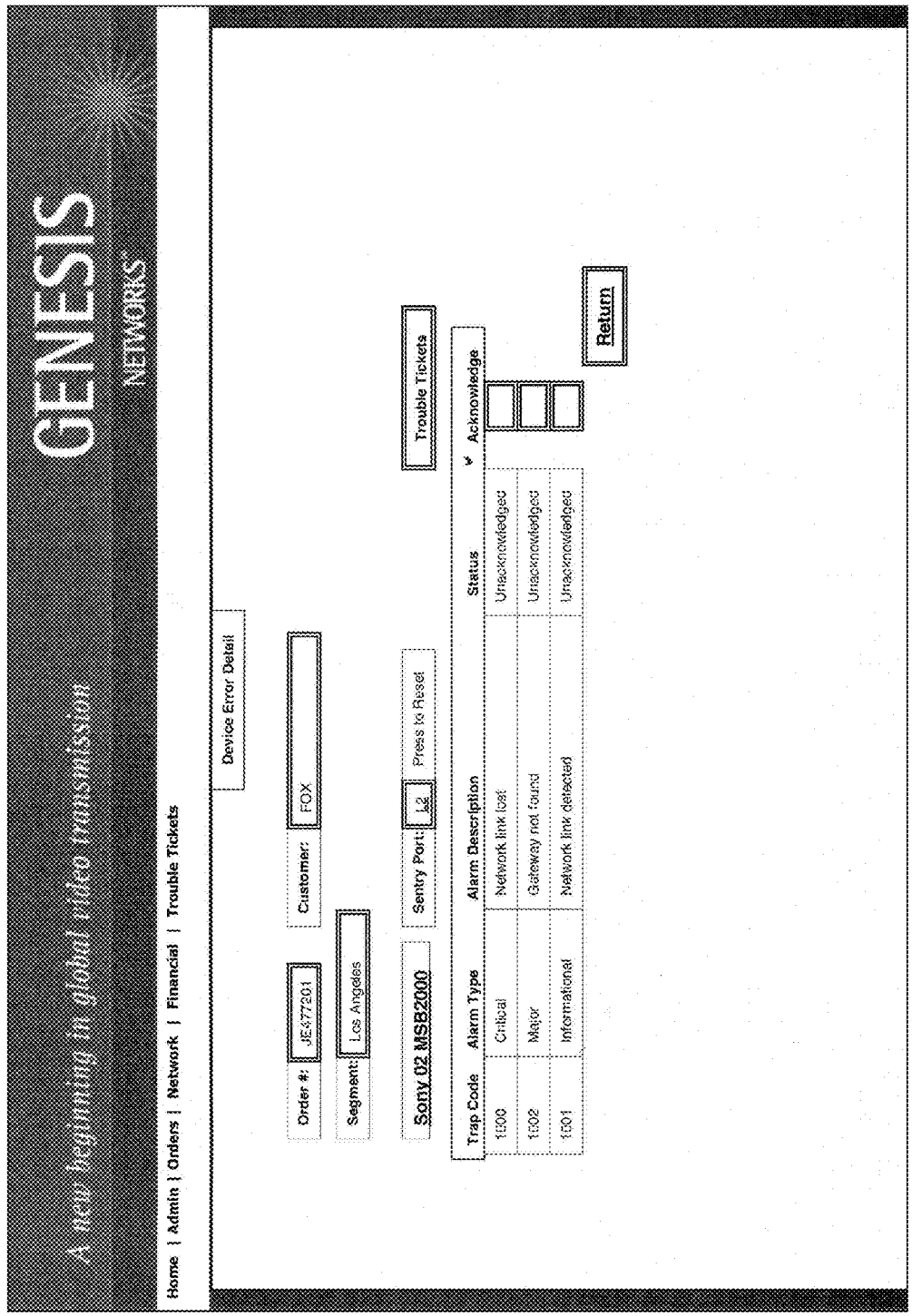
FIG. 3E.

FIG. 3C depicts a sample user interface that shows the network status for pending and/or active data connections. FIG. 3D depicts a sample user interface that provides detailed information on the equipment and facilities used to carry out a data connection including equipment that is in a failed or alarm condition. FIG. 3E depicts a sample user interface that provides specific detailed information relating to an equipment alarm condition.

Figure 5:
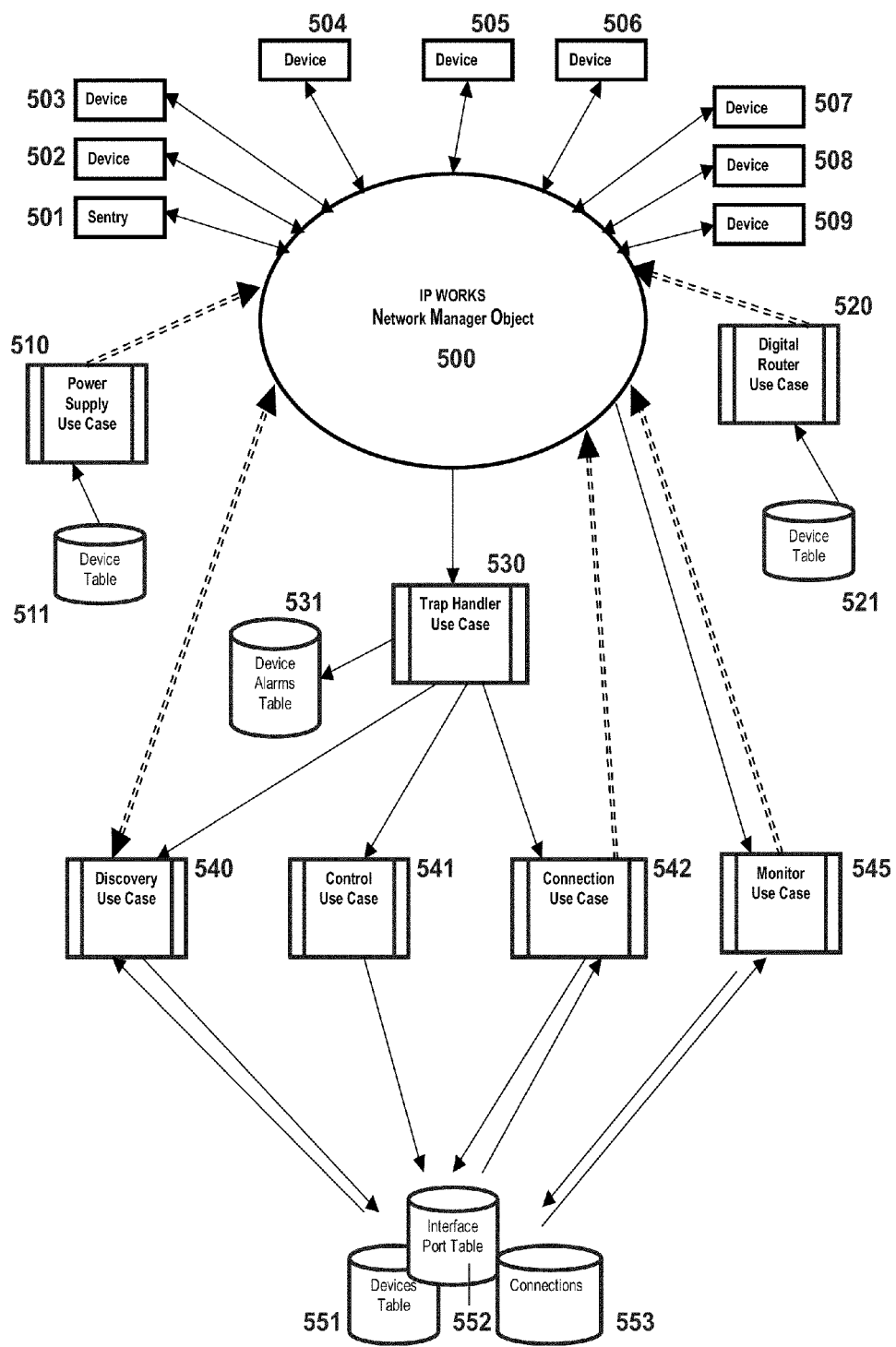
FIG. 5.

FIG. 5 depicts a preferred software control system operation flow for the present invention. The software control system implements a network manager topology to manage the equipment that comprises the data transmission network. In this preferred embodiment of the present invention, the Microsoft software product IP Works is implemented. As depicted in FIG. 5, the Network Manager Object 500 manages the operation flow for the software control system. In particular, it provides a gateway between devices and the specific software use cases via encapsulated SNMP Application Programming Interfaces (APIs).

By way of the Network Manager 500, the software control system sends traps to Devices 502, 503, 504, 505, 506, 507, 508, 509, etc., and to Sentry 501. The devices represent the network transmission equipment that is located within the various POP Locations. Software traps are used to test for a particular condition in a running software program; for example, to "trap an interrupt" means to wait for a particular interrupt to occur and then execute a corresponding routine; an error trap tests for an error condition and provides a recovery routine; a debugging trap waits for the execution of a particular instruction in order to stop the program and analyze the status of the system at that moment.

The Sentry 501 is used in power supply management of the devices. Through implementation of Device Table 511, the Power Supply Use Case 510 is able to reset the Sentry 501 and cycle power to equipment in a POP Location. Also, through implementation of Device Table 521, the Digital Router Use Case 520 controls the routing configuration used to carry out the service orders.

The Network Manager 500 invokes the Trap Handler Use Case 530 through implementation of the Device Alarms Table 531. Trap Handler Case 530 invokes the appropriate use case, as needed by the software control system. Use cases include the Discovery Use Case 540, Control Use Case 541, and the Connection Use Case 542.

Discovery Use Case 540 retrieves new device information from the Network Manager 500 for the data communications network. Discovery Use Case 540 also retrieves and updates data as new devices are added to the network via use of Device Table 531, Interface Port Table 552 and Connections Table 553.

Control Use Case 541 updates the operational status via use of Device Table 531, Interface Port Table 552 and Connections Table 553.

Connection Use Case 542 initiates and terminates connections via communication with the Network Manager 500. Connection Use Case 542 also retrieves schedule data, updates operational status, and updates bandwidth activation and deactivation via use of Device Table 531, Interface Port Table 552 and Connections Table 553.

The Network Manager 500 uses Monitor Use Case 545 to monitor devices on the network. Monitor Use Case 545 retrieves device connection data via use of Device Table 531, Interface Port Table 552 and Connections Table 553.

Many of these software operations run "in the background" and do not require user activation or initiation. However, user or system administrator intervention may also be used to control system operation and/or override automatic processes.

Account Management. The software control system can be used to access a user's account to see completed orders, pending orders, and associated charges. The user can also view summaries of ongoing and historical usage and associated billing and can also request pricing for services and transmission scenarios to compare transmission options and determine the most desired approach.

EXAMPLES

Broadcast Engineering

A network system provides an extensive worldwide footprint of terrestrial fiber optic lines and multiple global teleports to uplink to orbiting satellite. A Video-over-IP network as disclosed and claimed provides substantial benefits to many broadcasters and broadcast engineers, including: (1) Prioritized transmission packets for outstanding QoS at any bit rate; (2) Better flow management for more reliable delivery—no traffic jams or lockouts; (3) Portable bandwidth services—enabling allocation of bandwidth anywhere it's needed; (4) Ability to book bandwidth as needed—avoiding over purchasing or underutilizing; (5) One-stop-shop transmission capabilities and application flexibility—blending video, voice and data services into value-rich solutions; (6) Real-time remote control over provisioning, scheduling and routing—from master studios or out in the field; (7) Advanced scheduling and on-demand rescheduling—to accommodate the unforeseen.

Sports Broadcaster

A Dublin-based all-sports broadcaster needed to feed recipients event-based programming around the world, while conforming to each destination point's unique format requirements. For instance, some content would have to conform to NTSC standards, for US markets, and others to PAL standards, for Europe and Asia. In addition, the broadcaster needed a service provider that could offer enough global reach and flexibility to handle both SD and HD content, at differing bit rates, to various points on the globe. Previously, the broadcaster's original setup for this distribution mode was satellite based and it was very expensive to downlink and uplink across the world to deliver this in-demand content. Using the present invention provides the cost-effective alternative of offering our all-terrestrial fiber-optic routes for distribution, or integrated satellite and fiber optic routes. This lowers delivery costs—and with no loss in quality, format flexibility or standards compliance. As a result, the broadcaster realized significant cost savings and operational efficiencies.

Health Channel Broadcaster

An India-based broadcaster needed to launch a new English language health and wellness channel in US markets. The channel needed to appear as a virtual US-based entity. Using the invention disclosed herein, the broadcaster received a total turnkey solution which included serving as the origination point, managing all content received, building content into a playlist and cost-effectively distributing it to the US cable marketplace. Content was originated in Dallas and other regions of the country, content files are then sent to the network, those files are compiled and managed into a playlist, and then distributed out to multiple points via satellite. The viewer experiences seamless 24/7 HD programming that appears to be originating from the company's own studios, not from a playlist that was actually compiled and saved remotely.

24/7 Customer

Here dedicated network capacity was provided in varying increments between 2 Mbps and 270 Mbps uncompressed. Using the invention, high-end compression equipment for all encoding, transcoding and decoding was used. The customer received high quality signal transmission, at varying bit rate, on a network that can interface with, and accept all, digital and analog standards, which means a higher quality signal with no unnecessary conversions. Further, the customer was able to transmit both compressed and uncompressed analog signals over the inventive flexible network.

Teleport Customer

A customer required seamless blend of fiber and satellite routing capabilities. The invention provided a broadcaster a complete, flexible, end-to-end solution. Current Teleport facilities include those in Amsterdam, Atlanta, Auckland, Cheyenne, Denver, Hong Kong, Jerusalem, London, Los Angeles, Madrid, Milan, New York, Paris/Rambouillet, Singapore, Sydney, Toronto, Washington, D.C.

POP Locations

ASIA-PACIFIC: Auckland Beijing Hong Kong Kuala Lumpur Mumbai New Delhi Singapore Sydney Taipei Tokyo.

EUROPE: Amsterdam Birmingham Bristol Brussels Dublin Edinburgh Gateshead Glasgow Harrogate Leeds London Luxembourg Madrid Manchester Milan Moscow Newcastle Paris Rome Vienna Warsaw Wilmslow Zurich MIDDLE EAST: Jerusalem Tel Aviv NORTH AMERICA: Atlanta Austin Bristol Charlotte Cheyenne Dallas Denver Los Angeles Louisville Lynchburg Mexico City Miami Montreal New York Newark Raleigh Richmond San Francisco Seattle State College Toronto Washington, D.C.

SOUTH AMERICA Buenos Aires

While the invention has been particularly shown and described in the foregoing detailed description, it will be understood by those skilled in the art that various other changes in form and detail may be made without departing from the spirit and scope of the invention. Additional advantages and modifications will readily appear to those skilled in the art. It is intended that the specification and examples be considered exemplary only, with the true scope and spirit of the invention indicated by the claims below. The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

What is claimed is:

1. A system for controlling a transport of data across an integrated satellite and fiber optic transmission network, said transmission network comprising a local POP location and a remote POP location, said POP locations each comprising equipment in operable association, said equipment comprising at least one digital router, a customer premises circuit on said router, at least one transcoder, a standards converter, a video gateway device, and an IP switch, said system comprising:

a graphical user interface used to input a service order comprising an identity of a data stream, a service time, at least one service circuit parameter, and a destination;

a database comprising (i) information relating to the service order, said service order information including the identity of the desired data stream and data relating to the availability of bandwidth needed to transport the desired data stream to the specified destination at the specified service time, and (ii) information relating to the operation of at least two of said plurality of routers in the transmission network, said operational information including data relating to configuration and operational status of a router, and data relating to future availability of a router to transport the desired data stream;

computer readable program code used to automatically (i) access the database to identify at least two of the plurality of routers that are available to transport the desired data stream across the transmission network the specified destination at the specified service time and using the specified service circuit parameter; (ii) schedule the service order using the identified at least two routers to transport the desired data stream across the transmission network to the destination at the specified service time and using the specified service circuit parameter; and (iii) activate each of the identified at least two routers at the desired service time to transport the desired data stream to the specified destination in near real time using the identified at least two routers and a packet-based transmission network.

2. The system according to claim 1, further comprising computer readable program code used to modify a previously scheduled service order by changing at least one of the following: the identity of the desired data stream; the service time; the at least one service circuit parameter; and the destination.

3. The system according to claim 1, further comprising computer readable program code to monitor a status of the identified router used to transport the data and using the graphical user interface to display the status.

4. The system according to claim 1, wherein the graphical user interface provides at least one pull-down menu for use in entering at least one of the following: the identity of the desired data stream, the service time, the at least one service circuit parameter, and the destination.

5. The system according to claim 1, further comprising computer readable program code capable of defining a new type of service circuit by modifying the at least one service circuit parameter.

6. The system according to claim 1, further comprising computer readable program code capable of automatically making a new type of service circuit thereafter accessible to the user via a pull-down menu.

7. The system according to claim 1, further comprising computer readable program code capable of displaying an alarm via the graphical user interface when at least one of the routers triggers an alarm condition.

8. The system according to claim 1, further comprising computer readable program code capable of accessing the database to record a level of use of the transmission network by one or more users.

9. The system according to claim 1, where in the graphical user interface is capable of providing one or more users with an accounting of usage.

* * * * *